United States Patent
Liu et al.

(10) Patent No.: US 10,400,669 B2
(45) Date of Patent: Sep. 3, 2019

(54) ELECTRIC STARTER WITH MANUAL TURNING FUNCTION

(71) Applicant: CHONGQING STARTING POWER UNIT CO. LTD., Chongqing (CN)

(72) Inventors: Shuquan Liu, Chongqing (CN); Yangguang Lin, Chongqing (CN); Da'an Zhu, Shanghai (CN)

(73) Assignee: CHONGQING STARTING POWER UNIT CO., LTD., Chongqing (CN)

( * ) Notice: Subject to any disclaimer, the term of this patent is extended or adjusted under 35 U.S.C. 154(b) by 71 days.

(21) Appl. No.: 15/745,002

(22) PCT Filed: Jun. 21, 2017

(86) PCT No.: PCT/CN2017/089269
§ 371 (c)(1),
(2) Date: Jan. 15, 2018

(87) PCT Pub. No.: WO2018/006707
PCT Pub. Date: Jan. 11, 2018

(65) Prior Publication Data
US 2018/0209334 A1 Jul. 26, 2018

(30) Foreign Application Priority Data
Jul. 7, 2016 (CN) .......................... 2016 1 0533691

(51) Int. Cl.
*F02B 77/08* (2006.01)
*F02N 11/08* (2006.01)
(Continued)

(52) U.S. Cl.
CPC .............. *F02B 77/083* (2013.01); *F02N 1/00* (2013.01); *F02N 11/08* (2013.01);
(Continued)

(58) Field of Classification Search
CPC ...... F02N 11/10; F02N 11/101; F02N 11/106; F02N 11/108; F02N 1/00; F02N 1/005; F02N 1/02; F02N 2250/00; F02N 15/067
See application file for complete search history.

(56) References Cited

U.S. PATENT DOCUMENTS 3,321,985 A * 5/1967 Wheeler ............... F02F 7/0046
123/179.22
4,415,812 A * 11/1983 Griffith ................. F02N 11/101
290/31
(Continued)

FOREIGN PATENT DOCUMENTS

CN 1793640 6/2006
CN 2839612 11/2006
(Continued)

OTHER PUBLICATIONS

International Search Report for International Application No. PCT/CN2017/089269 dated Sep. 15, 2017.

*Primary Examiner* — Sizo B Vilakazi
*Assistant Examiner* — Kevin R Steckbauer (57) ABSTRACT

Disclosed is an electric starter with a manual turning function. A main shaft, a drive gear mechanism, a shift fork, an electromagnetic relay guide rod and a first return spring are arranged in a housing of the electric starter. A gear shifting mechanism comprises a force receiving component which extends out of the housing of the electric starter and serves as an external force applying point so as to promote the electromagnetic relay guide rod to move rightwards, a normally closed switch for cutting off a power supply of the electric starter when the force receiving component moves to an extreme position, a positioning component for locking the force receiving component when the force receiving component moves to the extreme position, and a first return component which enables the force receiving component to automatically returns to an original state when the force receiving component is unlocked. The main shaft is indirectly driven to rotate by the turning mechanism via a transmission mechanism or directly driven to rotate by the turning mechanism via a turning tool. An improvement is made to a structure of a traditional electric starter without (Continued)

affecting existing functions thereof, i.e., a function of manual turning is added. Therefore, a flywheel gear of a motor can be precisely positioned during maintenance so as to improve efficiency and eliminate potential safety hazards.

9 Claims, 5 Drawing Sheets

(51) Int. Cl.
| | |
|---|---|
| *F02N 11/10* | (2006.01) |
| *F02N 15/06* | (2006.01) |
| *F16H 35/18* | (2006.01) |
| *F02N 1/00* | (2006.01) |
| *F02N 1/02* | (2006.01) |
| *F02N 11/00* | (2006.01) |

(52) U.S. Cl.
CPC .......... *F02N 11/0851* (2013.01); *F02N 11/10* (2013.01); *F02N 11/101* (2013.01); *F02N 15/067* (2013.01); *F16H 35/18* (2013.01); F02N 1/005 (2013.01); F02N 1/02 (2013.01); F02N 11/00 (2013.01); F02N 11/106 (2013.01); F02N 11/108 (2013.01); F02N 15/062 (2013.01); F02N 2200/04 (2013.01); F02N 2250/00 (2013.01)

(56) References Cited

U.S. PATENT DOCUMENTS

| | | | | |
|---|---|---|---|---|
| 6,595,090 | B1* | 7/2003 | McQuillin | B25B 27/0035 123/179.26 |
| 8,606,475 | B2* | 12/2013 | Yasui | F16H 61/12 701/22 |
| 9,033,848 | B2* | 5/2015 | Deng | F02N 15/02 475/331 |
| 9,506,443 | B2* | 11/2016 | Morise | F02N 11/003 |
| 9,726,132 | B2* | 8/2017 | Pawlicki | F02N 7/08 |
| 10,260,472 | B2* | 4/2019 | Kamada | F02N 11/0818 |
| 2009/0255502 | A1* | 10/2009 | Cook | A01D 34/6818 123/185.3 |
| 2010/0312424 | A1* | 12/2010 | Yasui | F16H 61/12 701/22 |
| 2014/0202283 | A1* | 7/2014 | Deng | F02N 15/02 74/7 C |
| 2014/0323269 | A1* | 10/2014 | Morise | F02N 11/003 477/99 |
| 2016/0375528 | A1* | 12/2016 | Pawlicki | F02N 7/08 74/405 |
| 2018/0149129 | A1* | 5/2018 | Kamada | F02N 11/0818 |

FOREIGN PATENT DOCUMENTS

| | | |
|---|---|---|
| CN | 103189636 | 7/2013 |
| CN | 103939587 | 7/2014 |
| CN | 204175495 | 2/2015 |
| CN | 106014747 | 10/2016 |

* cited by examiner

ELECTRIC STARTER WITH MANUAL TURNING FUNCTION

FIELD OF THE INVENTION

The present disclosure relates to an electric starter for detection and maintenance of a motor. A manual turning function is added to an existing electric starter, and the present disclosure belongs to the technical field of mechanical structure.

BACKGROUND OF THE INVENTION

Figure 1:
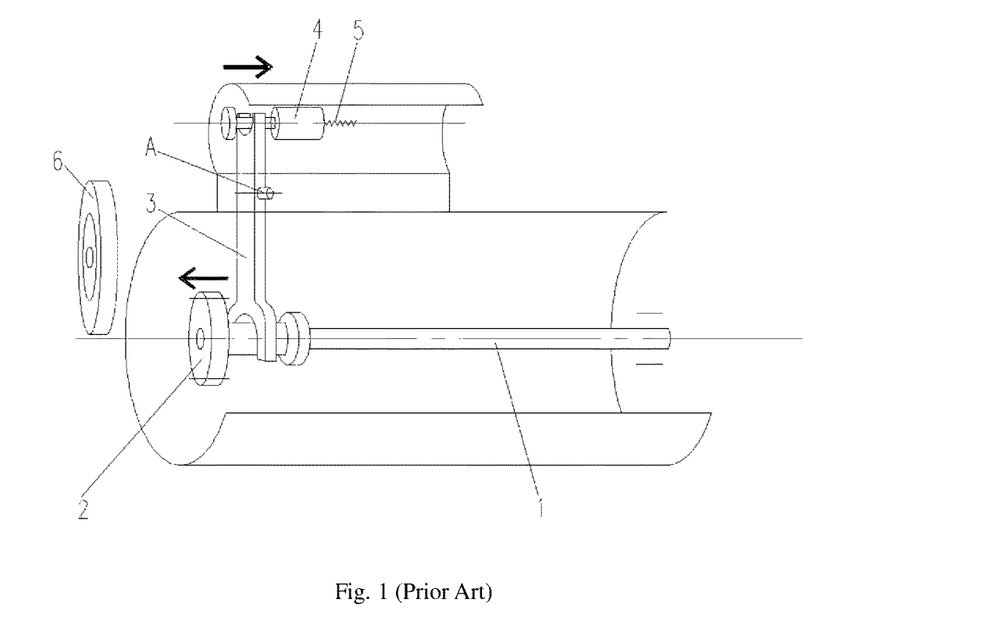
FIG. 1 schematically shows a structure of a traditional electric starter.

Most existing motors are assembled with an electric starter. As shown in FIG. 1, a main shaft 1, a drive gear mechanism 2, a shift fork 3, an electromagnetic relay guide rod 4 and a first return spring 5 are arranged in a housing of the electric starter. The electromagnetic relay guide rod 4 moves rightwards, which promotes the shift fork 3 to rotate clockwise around a hinge joint A. An upper end of the shift fork 3 compresses the first return spring 5, and a lower end of the shift fork 3 enables the main shaft 1 to move leftwards so that the drive gear mechanism 2 engages with a flywheel gear 6 of a motor. Then, the main shaft 1 promotes the flywheel gear 6 to rotate at a high speed. However, when the motor needs to be turned before work, the flywheel gear 6 is required to rotate at a low speed, but an existing electric starter can only realize high-speed rotation of the flywheel gear 6 and does not have a manual turning function.

Traditional electric starters do not have the manual turning function. During detection and maintenance of a motor, a flywheel gear of the motor can only be levered to rotate by means of a steel crowbar. Although low-speed precise rotation can be realized, there are potential safety hazards (for example, if an operator forgets to take down the steel crowbar, the steel crowbar might be popped out when the flywheel gear of the motor rotates, which will cause casualty or equipment malfunction), and efficiency thereof is low.

SUMMARY OF THE INVENTION

An improvement is made to a structure of a traditional electric starter without affecting existing functions thereof, i.e., a function of manual turning is added. Therefore, a flywheel gear of a motor can be precisely positioned during maintenance so as to improve efficiency and eliminate potential safety hazards.

The present disclosure provides an electric starter with a manual turning function. A main shaft, a drive gear mechanism, a shift fork, an electromagnetic relay guide rod and a first return spring are arranged in a housing of the electric starter. An upper fork of the shift fork bites the electromagnetic relay guide rod; a lower fork of the shift fork bites the main shaft; and a middle portion of the shift fork is hinged to the housing of the electric starter via a hinge joint A. The electric starter further comprises a gear shifting mechanism and a turning mechanism. The gear shifting mechanism comprises a force receiving component which extends out of the housing of the electric starter and serves as an external force applying point so as to promote the electromagnetic relay guide rod to move rightwards, a normally closed switch for cutting off a power supply of the electric starter when the force receiving component moves to an extreme position, a positioning component for locking the force receiving component when the force receiving component moves to the extreme position, and a first return component which enables the force receiving component to automatically returns to an original state when the force receiving component is unlocked. The turning mechanism is arranged on a right side of the main shaft; an opening for insertion of a wrench or a sleeve-like turning tool is provided in a housing of the turning mechanism; and the main shaft is indirectly driven to rotate by the turning mechanism via a transmission mechanism or directly driven to rotate by the turning mechanism via a turning tool.

As a preferred selection of the abovementioned solution, when the main shaft is indirectly driven to rotate via the transmission mechanism, the turning mechanism is provided with a turning shaft, which is fixedly connected with a driving portion of the transmission mechanism and is driven to rotate by the turning tool, and a second return component, which promotes the turning shaft to axially move by extension or contraction so as to achieve engagement or separation of the driving portion of the transmission mechanism and a driven portion thereof. When the turning shaft is pressed, the second return component contracts, and the driving portion of the transmission mechanism engages with the driven portion thereof; and when pressure on the turning shaft is relieved, the second return component returns to an original state, and the driving portion of the transmission mechanism is separated from the driven portion thereof.

As a first preferred structure of the above gear shifting mechanism, the gear shifting mechanism comprises a pushrod mechanism, a normally closed switch, a locking groove, and a second return spring. The pushrod mechanism is arranged just above the electromagnetic relay guide rod; a movable handle is arranged on a top of the pushrod mechanism; a left end of the pushrod mechanism extends downwards to form a push plate directly facing the electromagnetic relay guide rod; the locking groove is arranged in the housing of the electric starter; and the second return spring is arranged on a right side of the pushrod mechanism. An external force is exerted on the moveable handle, and the electromagnetic relay guide rod is pushed to move rightwards by the push plate; when the pushrod mechanism moves to an extreme position, the normally closed switch cuts off the power supply of the electric starter, and the moveable handle is locked in the locking groove after rotation; after being unlocked, the moveable handle automatically returns to an original state under a restoring force of the second return spring.

As a second preferred structure of the above gear shifting mechanism, the gear shifting mechanism comprises a pushrod, a normally closed switch and a second return spring. The pushrod is arranged on a left side of the electromagnetic relay guide rod; a lock clip is arranged on the pushrod; a press plate is arranged at a left end of the pushrod; a push plate is arranged at a right end of the pushrod; a gap directly facing the lock clip is arranged in the housing of the electric starter; and the pushrod is sleeved with the second return spring. An external force is exerted on the press plate, and the electromagnetic relay guide rod is pushed to move rightwards by the push plate; when the pushrod moves to an extreme position, the lock clip passes through the gap 16 into the housing of the electric starter; the pushrod is rotated to make the lock clip unable to pass through the gap, and therefore the pushrod is locked; the normally closed switch cuts off the power supply of the electric starter; and after being unlocked, the pushrod automatically returns to an original state under a restoring force of the second return spring.

As a third preferred structure of the above gear shifting mechanism, the gear shifting mechanism comprises a lock board, a normally closed switch and a shift fork extension rod which is formed by an upward extension of a top end of the shift fork. An external force is exerted on a top end of the shift fork extension rod, and the electromagnetic relay guide rod is pushed to move rightwards by the shift fork extension rod; when the shift fork extension rod moves to an extreme position, the shift fork extension rod is locked by the lock board after rotation; the normally closed switch cuts off the power supply of the electric starter; and after being unlocked, the shift fork extension rod automatically returns to an original state under a restoring force of the second return spring.

Preferably, two bevel gears engaged with each other, or a worm-gear or two cylindrical gears, are used for transmission of the transmission mechanism. When the two bevel gears engaged with each other and the worm-gear are used for transmission, the opening is arranged on a top of a housing of the turning mechanism; and when the two cylindrical gears are used for transmission, the opening is arranged on a right side of the housing of the turning mechanism.

The present disclosure has following beneficial effects. The gear shifting mechanism and the turning mechanism are integrated to the electric starter, so that a traditional electric starter can have a new manual turning function. There is no need to refit a housing of a traditional motor flywheel, and space for independently arranging the turning mechanism is saved. The normally closed switch in the electric starter serves as a normally closed conversion protection device, so that a starting function and a turning function cannot be achieved simultaneously and no harm will be brought about to personnel and equipment. Meanwhile, the gear shifting mechanism has an automatical return function after being unlocked, and the transmission mechanism of the turning mechanism also has an automatical return function, so that it is more convenient, safer and more reliable to operate and use the electric starter. Double safety can be achieved in combination with the normally closed switch. Besides, by manually turning, the flywheel gear of the motor can be positioned conveniently and precisely during overhaul and maintenance, so that working efficiency can be improved and potential safety hazards of a traditional manner can be eliminated.

DETAILED DESCRIPTION OF THE EMBODIMENTS

The present disclosure will be further explained hereinafter with reference to the embodiments in combination with the accompanying drawings.

As shown in FIGS. 2 to 9, the present disclosure provides an electric starter with a manual turning function. Besides an existing housing of the electric starter and a main shaft 1, a drive gear mechanism 2, a shift fork 3, an electromagnetic relay guide rod 4 and a first return spring 5 which are arranged in the housing of the electric starter, the electric starter further comprises a gear shifting mechanism and a turning mechanism. An upper fork of the shift fork 3 bites the electromagnetic relay guide rod 4; a lower fork of the shift fork 3 bites the main shaft 1; and a middle portion of the shift fork 3 is hinged to the housing of the electric starter via a hinge joint A.

The gear shifting mechanism comprises a force receiving component which extends out of the housing of the electric starter and serves as an external force applying point so as to promote the electromagnetic relay guide rod 4 to move rightwards, a normally closed switch 7 for cutting off a power supply of the electric starter when the force receiving component moves to an extreme position, a positioning component for locking the force receiving component when the force receiving component moves to the extreme position, and a first return component which enables the force receiving component to automatically returns to an original state when the force receiving component is unlocked.

The turning mechanism is arranged on a right side of the main shaft 1. An opening 8 for insertion of a wrench or a sleeve-like turning tool is provided in a housing of the turning mechanism. The opening 8 is made into an internal hexagon opening, an internal spline opening, an external hexagon opening and so on, so that it is convenient to insert the wrench or the sleeve-like turning tool so as to drive the turning mechanism to rotate. The main shaft 1 is indirectly driven to rotate by the turning mechanism via a transmission mechanism or directly driven to rotate by the turning mechanism via a turning tool.

Figure 6:
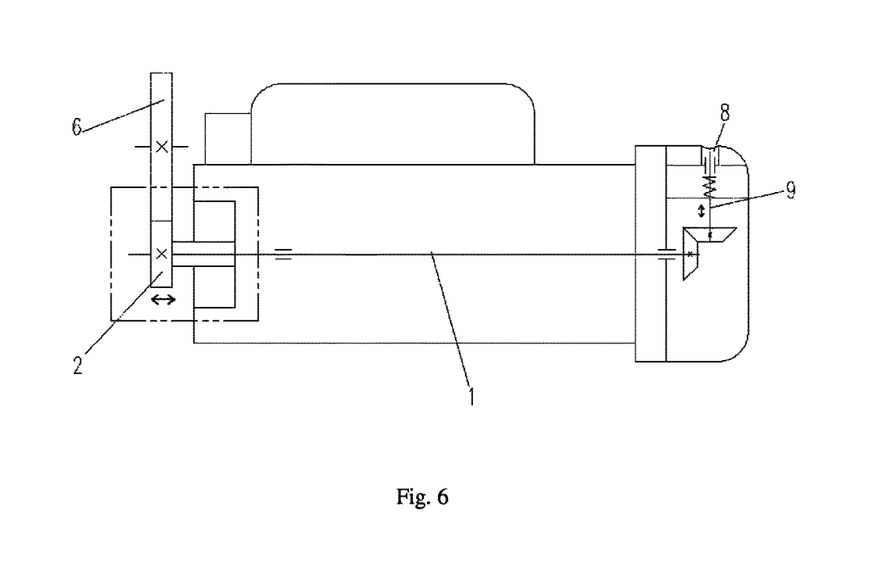
FIG. 6 schematically shows a first structure of a turning mechanism of the present disclosure.
Figure 7:
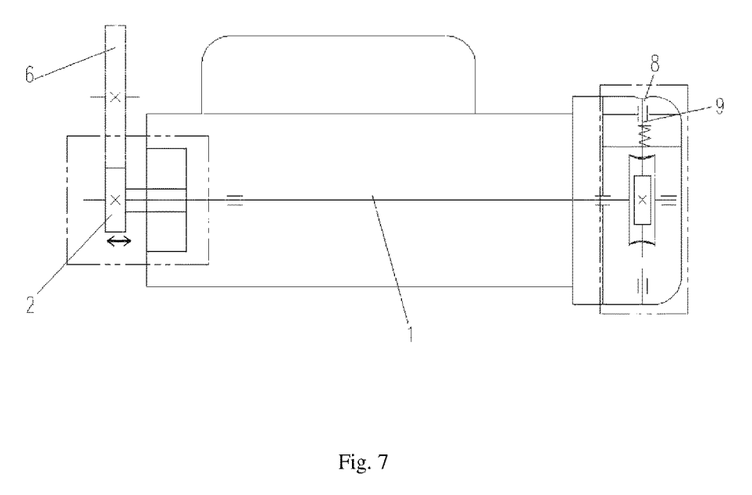
FIG. 7 schematically shows a second structure of a turning mechanism of the present disclosure.
Figure 8:
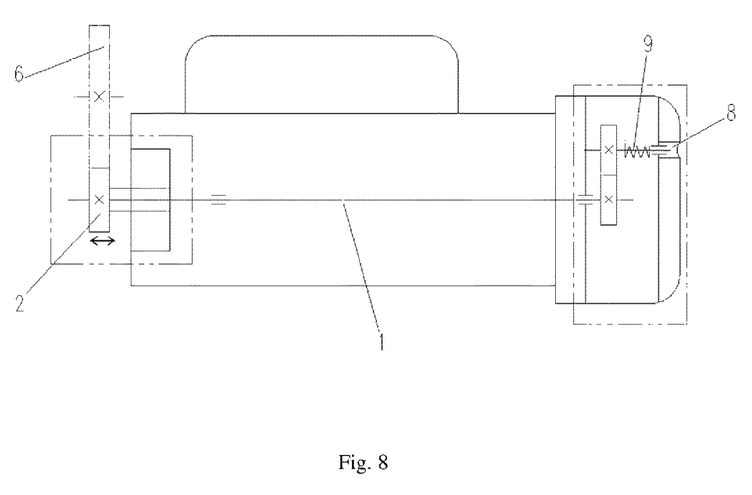
FIG. 8 schematically shows a third structure of a turning mechanism of the present disclosure.

When the main shaft 1 is indirectly driven to rotate via the transmission mechanism, the turning mechanism is provided with a turning shaft 9, which is fixedly connected with a driving portion of the transmission mechanism and is driven to rotate by the turning tool, and a second return component, which promotes the turning shaft 9 to axially move by extension or contraction so as to achieve engagement or separation of the driving portion of the transmission mechanism and a driven portion thereof. When the turning shaft 9 is pressed, the second return component contracts, and the driving portion of the transmission mechanism engages with the driven portion thereof; and when pressure on the turning shaft 9 is relieved, the second return component returns to an original state, and the driving portion of the transmission mechanism is separated from the driven portion thereof.

Embodiment 1 of the Gear Shifting Mechanism

Figure 2:
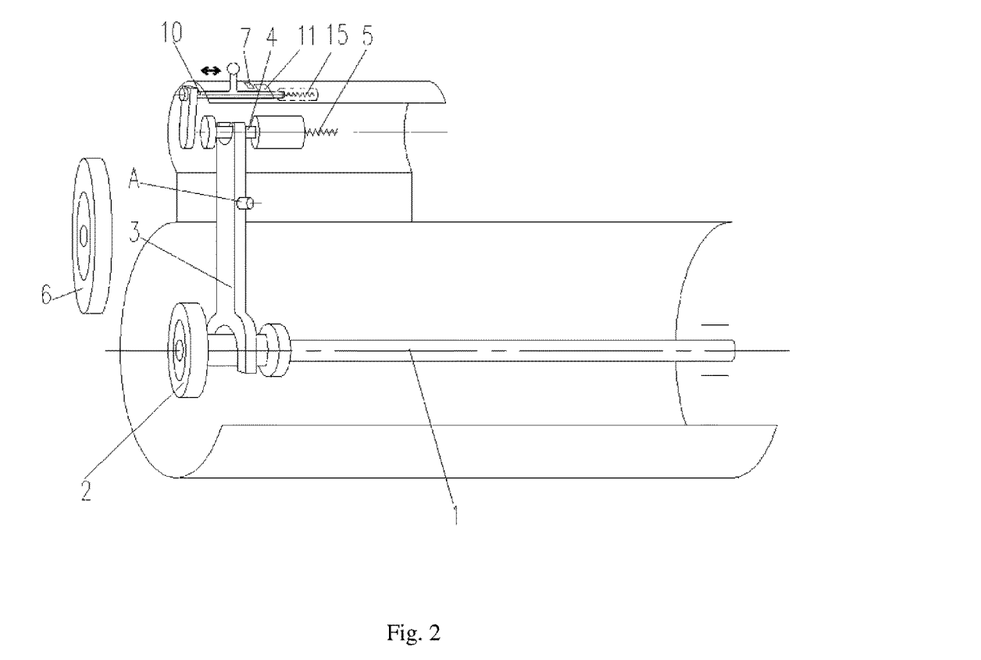
FIG. 2 schematically shows a first structure of a gear shifting mechanism of the present disclosure.

As shown in FIG. 2, the gear shifting mechanism comprises a pushrod mechanism 10, a normally closed switch 7, a locking groove 11, and a second return spring 15. The pushrod mechanism 10 serves as a force receiving component; the locking groove 11 serves as a positioning component; and the second return spring 15 serves as a first return component. The pushrod mechanism 10 is arranged just above the electromagnetic relay guide rod 4. A movable handle is arranged on a top of the pushrod mechanism 10, and a left end of the pushrod mechanism 10 extends downwards to form a push plate directly facing the electromagnetic relay guide rod 4. The locking groove 11 is arranged in the housing of the electric starter. The second return spring 15 is arranged on a right side of the pushrod mechanism 10.

A sliding groove for the movable handle arranged on the top of the pushrod mechanism 10 to pass through is further arranged in the housing of the electric starter.

An external force is exerted on the moveable handle, and the electromagnetic relay guide rod 4 is pushed to move rightwards by the push plate. When the pushrod mechanism 10 moves to an extreme position, the normally closed switch 7 cuts off the power supply of the electric starter. At this time, the drive gear mechanism 2 exactly engages with a flywheel gear 6 of a motor. The moveable handle is locked in the locking groove 11 after rotation. After being unlocked, the moveable handle automatically to an original state under a restoring force of the second return spring 15.

Embodiment 2 of the Gear Shifting Mechanism

Figure 3:
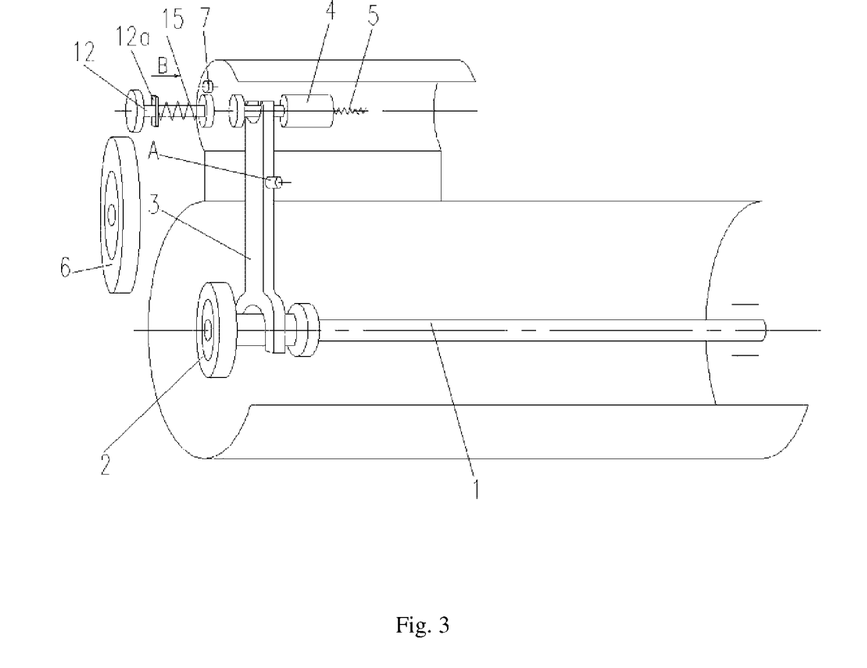
FIG. 3 schematically shows a second structure of a gear shifting mechanism of the present disclosure.
Figure 4:
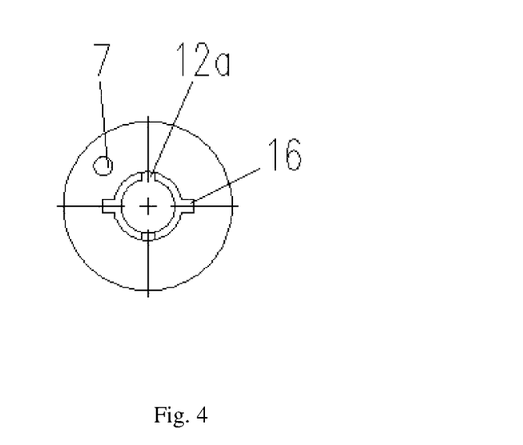
FIG. 4 schematically shows a partial view of FIG. 3 along a direction represented by B.

As shown in FIG. 3 and FIG. 4, the gear shifting mechanism comprises a pushrod 12, a normally closed switch 7 and a second return spring 15. The pushrod 12 serves as a force receiving component; a lock clip 12a of the pushrod 12 and a corresponding gap 16 arranged in the housing of the electric starter constitute a positioning component; and the second return spring 15 serves as a first return component. The pushrod 12 is arranged on a left side of the electromagnetic relay guide rod 4, and the lock clip 12a is arranged on the pushrod 12. A press plate is arranged at a left end of the pushrod 12, and a push plate is arranged at a right end of the pushrod 12. The gap 16 directly facing the lock clip 12a is arranged in the housing of the electric starter. The pushrod 12 is sleeved with the second return spring 15.

An external force is exerted on the press plate, and the electromagnetic relay guide rod 4 is pushed to move rightwards by the push plate. When the pushrod 12 moves to an extreme position, the lock clip 12a passes through the gap 16 into the housing of the electric starter. The pushrod 12 is rotated to make the lock clip 12a unable to pass through the gap 16, and therefore the pushrod 12 is locked. The normally closed switch 7 cuts off the power supply of the electric starter. Finally, the drive gear mechanism 2 engages with a flywheel gear 6 of a motor. After being unlocked, the pushrod 12 automatically returns to an original state under a restoring force of the second return spring 15. FIG. 4 shows a state when the pushrod 12 is locked.

Embodiment 3 of the Gear Shifting Mechanism

Figure 5:
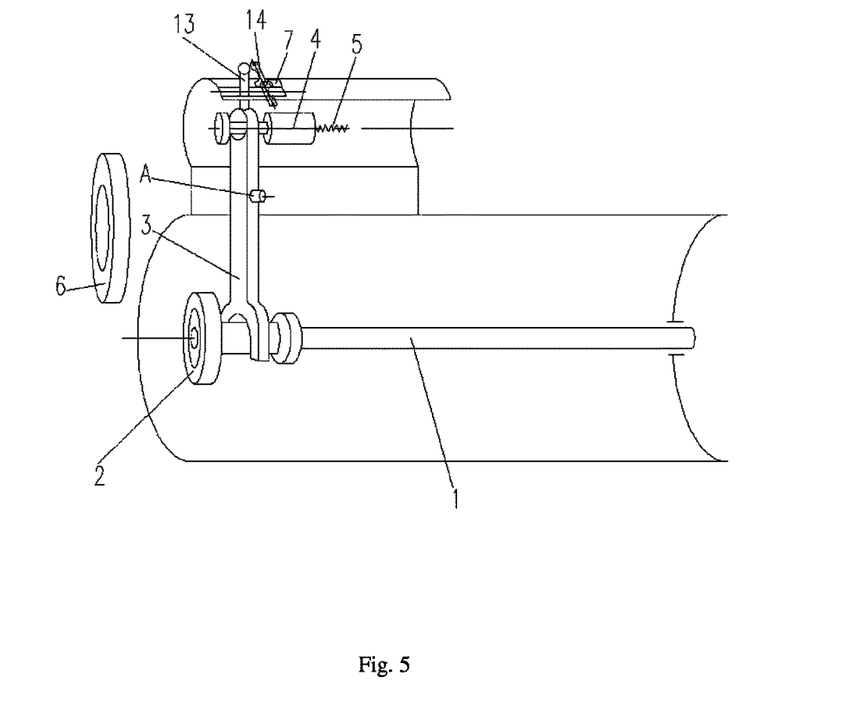
FIG. 5 schematically shows a third structure of a gear shifting mechanism of the present disclosure.

As shown in FIG. 5, the gear shifting mechanism comprises a lock board 14, a normally closed switch 7 and a shift fork extension rod 13 which is formed by an upward extension of a top end of the shift fork 3. A sliding groove for the shift fork extension rod 13 to pass through is arranged in the housing of the electric starter.

An external force is exerted on a moveable handle on a top end of the shift fork extension rod 13, and the moveable handle protrudes out of the housing of the electric starter. The electromagnetic relay guide rod 4 is pushed to move rightwards by the shift fork extension rod 13. When the shift fork extension rod 13 moves to an extreme position, the shift fork extension rod 13 is locked by the lock board 14 after rotation. The normally closed switch 7 cuts off the power supply of the electric starter, and the drive gear mechanism 2 engages with a flywheel gear 6 of a motor. After being unlocked, the shift fork extension rod 13 automatically returns to an original state under a restoring force of the first return spring 5. In FIG. 5, a state when the shift fork extension rod 13 is unlocked is shown by the lock board 14 in a solid line, and a state when the shift fork extension rod 13 is locked is shown by the lock board 14 in a dashed line.

Embodiment 1 of the Turning Mechanism

As shown in FIG. 6, an opening 8 for insertion of a wrench or a sleeve-like turning tool is provided in the housing of the turning mechanism. The main shaft 1 is indirectly driven to rotate by the turning mechanism via a transmission mechanism, and two bevel gears engaged with each other are used for transmission of the transmission mechanism. The opening 8 is arranged on a top of the housing of the turning mechanism. A turning shaft 9 is fixedly connected to a driving gear of the bevel gears and is driven to rotate by a turning tool. A return spring is used as a second return component. When the turning shaft 9 is pressed, the turning shaft 9 moves axially downwards, and the return spring is compressed, so that a driving portion of the transmission mechanism engages with a driven portion thereof. When pressure on the turning shaft 9 is relieved, the second return component returns to an original state, and the driving portion of the transmission mechanism is separated from the driven portion thereof.

Embodiment 2 of the Turning Mechanism

A structure of a turning mechanism as shown in FIG. 7 is basically similar to a structure as shown in FIG. 6. A difference of the structure as shown in FIG. 7 from the structure as shown in FIG. 6 is that a worm-gear is used for transmission of the transmission mechanism. The main shaft 1 is also indirectly driven to rotate by the transmission mechanism.

Embodiment 3 of the Turning Mechanism

A structure of a turning mechanism as shown in FIG. 8 is basically similar to the structure as shown in FIG. 6. Differences of the structure as shown in FIG. 8 from the structure as shown in FIG. 6 lie in that, two cylindrical gears are used for transmission of the transmission mechanism, and an opening 8 is arranged on a right side of the housing of the turning mechanism. The main shaft 1 is also indirectly driven to rotate by the transmission mechanism.

Embodiment 4 of the Turning Mechanism

Figure 9:
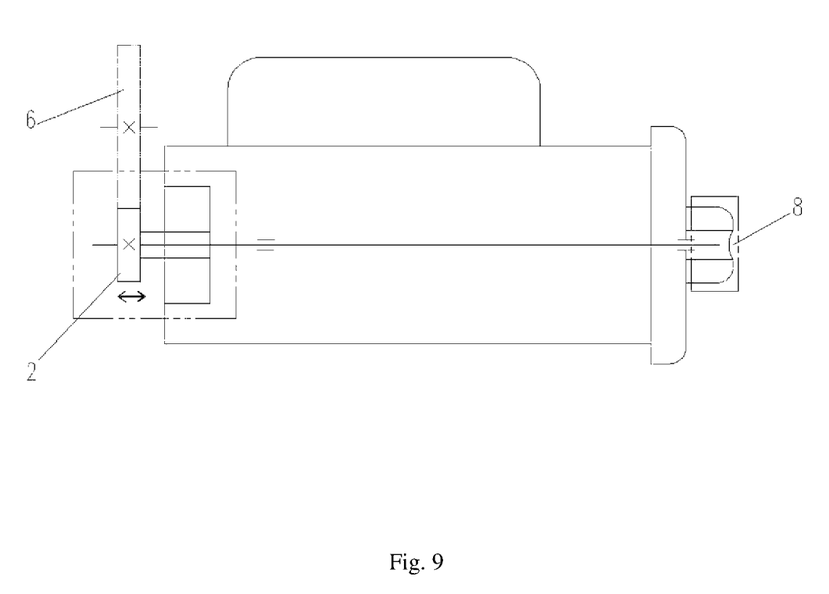
FIG. 9 schematically shows a fourth structure of a turning mechanism of the present disclosure.

As shown in FIG. 9, the main shaft 1 is directly driven to rotate by a turning tool. The main shaft 1 serves as a turning shaft, and the housing of the turning mechanism serves as a protecting cover.

The invention claimed is:

1. An electric starter with a manual turning function, comprising:

a main shaft (1), a drive gear mechanism (2), a shift fork (3), an electromagnetic relay guide rod (4) and a first return spring (5) are arranged in a housing of the electric starter, wherein an upper fork of the shift fork (3) bites the electromagnetic relay guide rod (4); a lower fork of the shift fork (3) bites the main shaft (1); and a middle portion of the shift fork (3) is hinged to the housing of the electric starter via a hinge joint (A), wherein the electric starter further comprises a gear shifting mechanism and a turning mechanism, wherein the gear shifting mechanism comprises a force receiving component which extends out of the housing of the electric starter and serves as an external force applying point so as to promote the electromagnetic relay guide rod (4) to move towards the turning mechanism, a normally closed switch (7) for cutting off a power supply of the electric starter when the force receiving component moves to an extreme position, a positioning component for locking the force receiving component when the force receiving component moves to the extreme position, and a first return component which enables the force receiving component to automatically return to an original state when the force receiving component is unlocked, and wherein the turning mechanism is arranged on a first side of the main shaft (1) furthest from the shift fork; an opening (8) for insertion of a wrench or a sleeve-like turning tool is provided in a housing of the turning mechanism; and the main shaft (1) is indirectly driven to rotate by the turning mechanism via a transmission mechanism or directly driven to rotate by the turning mechanism via a turning tool.

2. The electric starter with the manual turning function according to claim 1, wherein when the main shaft (1) is indirectly driven to rotate via the transmission mechanism, the turning mechanism is provided with a turning shaft (9), which is fixedly connected with a driving portion of the transmission mechanism and is driven to rotate by the turning tool, and a second return component, which promotes the turning shaft (9) to axially move by extension or contraction so as to achieve engagement or separation of the driving portion of the transmission mechanism and a driven portion thereof, and wherein when the turning shaft (9) is pressed, the second return component contracts, and the driving portion of the transmission mechanism engages with the driven portion thereof; and when pressure on the turning shaft (9) is relieved, the second return component returns to an original state, and the driving portion of the transmission mechanism is separated from the driven portion thereof.

3. The electric starter with the manual turning function according to claim 1, wherein the gear shifting mechanism comprises a pushrod mechanism (10), a normally closed switch (7), a locking groove (11), and a second return spring (15), wherein the pushrod mechanism (10) is arranged just above the electromagnetic relay guide rod (4); a movable handle is arranged on a top of the pushrod mechanism (10); a first end of the pushrod mechanism (10) furthest from the turning mechanism extends downwards to form a push plate directly facing the electromagnetic relay guide rod (4); the locking groove (11) is arranged in the housing of the electric starter; and the second return spring (15) is arranged on a side of the pushrod mechanism (10) opposite the first end of the pushrod mechanism; and wherein an external force is exerted on the moveable handle, and the electromagnetic relay guide rod (4) is pushed to move towards the turning mechanism by the push plate; when the pushrod mechanism (10) moves to an extreme position, the normally closed switch (7) cuts off the power supply of the electric starter, and the moveable handle is locked in the locking groove (11) after rotation; and after being unlocked, the moveable handle automatically returns to an original state under a restoring force of the second return spring (15).

4. The electric starter with the manual turning function according to claim 1, wherein the gear shifting mechanism comprises a pushrod (12), a normally closed switch (7) and a second return spring (15), wherein the pushrod (12) is arranged on a first side of the electromagnetic relay guide rod (4) furthest from the turning mechanism; a lock clip (12*a*) is arranged on the pushrod (12); a press plate is arranged at a first end of the pushrod (12); a push plate is arranged at a second end of the pushrod (12); a gap (16) directly facing the lock clip (12*a*) is arranged in the housing of the electric starter; and the pushrod (12) is sleeved with the second return spring (15), and wherein an external force is exerted on the press plate, and the electromagnetic relay guide rod (4) is pushed to move towards the turning mechanism by the push plate; when the pushrod 12 moves to an extreme position, the lock clip (12*a*) passes through the gap (16) into the housing of the electric starter; the pushrod (12) is rotated to make the lock clip (12*a*) unable to pass through the gap (16), and therefore the pushrod (12) is locked; the normally closed switch (7) cuts off the power supply of the electric starter; and after being unlocked, the pushrod (12) automatically returns to an original state under a restoring force of the second return spring (15).

5. The electric starter with the manual turning function according to claim 1, wherein the gear shifting mechanism comprises a lock board (14), a normally closed switch (7) and a shift fork extension rod (13) which is formed by an upward extension of a top end of the shift fork (3), and wherein an external force is exerted on a top end of the shift fork extension rod (13), and the electromagnetic relay guide rod (4) is pushed to move towards the turning mechanism by the shift fork extension rod (13); when the shift fork extension rod (13) moves to an extreme position, the shift fork extension rod (13) is locked by the lock board (14) after rotation; the normally closed switch (7) cuts off the power supply of the electric starter; and after being unlocked, the shift fork extension rod (13) automatically returns to an original state under a restoring force of the first return spring (5).

6. The electric starter with the manual turning function according to claim 2, wherein two bevel gears engaged with each other, or a worm-gear or two cylindrical gears, are used for transmission of the transmission mechanism, wherein when the two bevel gears engaged with each other and the worm-gear are used for transmission, the opening (8) is arranged on a top of a housing of the turning mechanism; and when the two cylindrical gears are used for transmission, the opening (8) is arranged on a side of the housing of the turning mechanism furthest from the shift fork.

7. The electric starter with the manual turning function according to claim 2, wherein the gear shifting mechanism comprises a pushrod mechanism (10), a normally closed switch (7), a locking groove (11), and a second return spring (15), wherein the pushrod mechanism (10) is arranged just above the electromagnetic relay guide rod (4); a movable handle is arranged on a top of the pushrod mechanism (10); a first end of the pushrod mechanism (10) furthest from the turning mechanism extends downwards to form a push plate directly facing the electromagnetic relay guide rod (4); the locking groove (11) is arranged in the housing of the electric starter; and the second return spring (15) is arranged on a side of the pushrod mechanism (10) opposite the first end of the pushrod mechanism; and wherein an external force is exerted on the moveable handle, and the electromagnetic relay guide rod (4) is pushed to move towards the turning mechanism by the push plate; when the pushrod mechanism (10) moves to an extreme position, the normally closed switch (7) cuts off the power supply of the electric starter, and the moveable handle is locked in the locking groove (11) after rotation; and after being unlocked, the moveable handle automatically returns to an original state under a restoring force of the second return spring (15).

8. The electric starter with the manual turning function according to claim 2, wherein the gear shifting mechanism comprises a pushrod (12), a normally closed switch (7) and a second return spring (15), wherein the pushrod (12) is arranged on a first side of the electromagnetic relay guide rod (4) furthest from the turning mechanism; a lock clip (12*a*) is arranged on the pushrod (12); a press plate is arranged at a first end of the pushrod (12); a push plate is arranged at a second end of the pushrod (12); a gap (16) directly facing the lock clip (12*a*) is arranged in the housing of the electric starter; and the pushrod (12) is sleeved with the second return spring (15), and wherein an external force is exerted on the press plate, and the electromagnetic relay guide rod (4) is pushed to move towards the turning mechanism by the push plate; when the pushrod 12 moves to an extreme position, the lock clip (12*a*) passes through the gap (16) into the housing of the electric starter; the pushrod (12) is rotated to make the lock clip (12*a*) unable to pass through the gap (16), and therefore the pushrod (12) is locked; the normally closed switch (7) cuts off the power supply of the electric starter; and after being unlocked, the pushrod (12) automatically returns to an original state under a restoring force of the second return spring (15).

9. The electric starter with the manual turning function according to claim 2, wherein the gear shifting mechanism comprises a lock board (14), a normally closed switch (7) and a shift fork extension rod (13) which is formed by an upward extension of a top end of the shift fork (3), and wherein an external force is exerted on a top end of the shift fork extension rod (13), and the electromagnetic relay guide rod (4) is pushed to move towards the turning mechanism by the shift fork extension rod (13); when the shift fork extension rod (13) moves to an extreme position, the shift fork extension rod (13) is locked by the lock board (14) after rotation; the normally closed switch (7) cuts off the power supply of the electric starter; and after being unlocked, the shift fork extension rod (13) automatically returns to an original state under a restoring force of the first return spring (5).

* * * * *